United States Patent [19]
Numagami et al.

[11] 3,912,661
[45] Oct. 14, 1975

[54] METHOD OF PREPARING CATALYST CARRYING METALLIC CATALYST

[75] Inventors: Kiyoshi Numagami, Yokohama; Toshiki Okuyama, Fujisawa; Tadanari Kato, Yokohama, all of Japan

[73] Assignee: Nissan Motor Company Limited, Yokohama, Japan

[22] Filed: Feb. 2, 1973

[21] Appl. No.: 329,066

[30] Foreign Application Priority Data
Feb. 8, 1972   Japan.............................. 47-013260

[52] U.S. Cl............................ 252/466 PT; 252/463
[51] Int. Cl.² ........................................ B01J 23/08
[58] Field of Search ..................... 252/466 PT, 463

[56] References Cited
UNITED STATES PATENTS

| | | | |
|---|---|---|---|
| 2,959,536 | 11/1960 | Brennan et al................ | 252/466 PT |
| 2,971,928 | 2/1961 | Brennan et al................ | 252/466 PT |
| 3,331,787 | 7/1967 | Keith et al. ................... | 252/466 PT |
| 3,741,725 | 6/1973 | Graham ....................... | 252/466 PT |
| 3,776,859 | 12/1973 | Simpson....................... | 252/466 PT |

*Primary Examiner*—Helen M. S. Sneed

[57] ABSTRACT

A method of preparing a catalyst comprising impregnating a catalyst carrier with an aqueous or alcohol solution of a catalytic metal compound and an aluminium salt, neutralizing the solution with an alkali, drying the catalyst carrier, and sintering the dried catalyst carrier.

11 Claims, 1 Drawing Figure

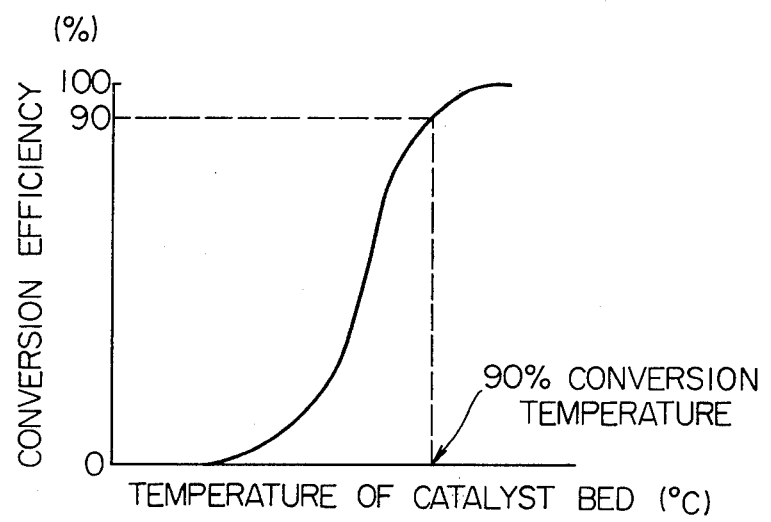

METHOD OF PREPARING CATALYST CARRYING METALLIC CATALYST

The present invention relates to methods of preparing a catalyst and, more particularly to a method of preparing an improved catalyst in which a metallic catalyst is uniformly adhered to a catalyst carrier.

The exhaust gases from the automotive internal combustion engines and the industrial plants contains toxic compounds such as carbon monoxide, unburned hydrocarbons and nitrogen oxides which cause the air pollution when emitted to the air. From the view point of preventing the air pollution, various attempts have heretofore been made to render the exhaust gases harmless by further oxidizing the carbon monoxide and unburned hydrocarbons and reducing or decomposing the nitrogen oxides before the exhaust gases are emitted to the atmosphere. One of such attempts is to use a catalyst which is placed in the exhaust system to convert the toxic contents of the exhaust gases into harmless compounds. It is well known in the art that the platinum group metals have activities suitable for the catalyst employed in the exhaust system. Since the platinum group metals are all so costly, it is necessitated to uniformly adhere to the surface of the catalyst carrier so as to make the catalyst satisfactorily active.

Various methods for adhering the catalytic material on the catalyst carrier have heretofore developed, some of which are methods available for the granulous catalyst carrier in the pellet or tablet form. One of such methods includes contacting a compound of an element from the platinum group metals with the surfaces of the catalyst carrier so as to make the compound to precipitate on the catalyst carrier because of hydrolysis of the compound. Another method includes impregnating a precipitant in the catalyst carrier and thereafter immersing the catalyst carrier in a solution containing an element from the platinum group metals thereby to cause the element to precipitate on the catalyst carrier. Still another method includes deeply impregnating an element of the platinum group metals into the catalyst carrier, placing the catalyst carrier containing the element in a stream flow, and heating the carrier thereby causing the element to concentrate adjacent the surfaces of the carrier. Although the abovementioned conventional methods are suitable for carrying the catalytic material of a metal selected from the platinum group metals only the surfaces of the granulous catalytic carrier at high density, these methods are disadvantageous in that tedious operations are necessitated in controlling the pH of the solution or in precisely controlling the flow rate of stream flow relative to the operation temperature. In addition, it has been a problem that the catalyst concentrates so much that the catalyst layer is subject to peeling thereby causing increase of the loss of the catalyst and degradation of the activity of the catalyst due to the limited exposed surface thereof.

Since it was revealed that the granulous catalyst is disadvantageous in its short life time because of attrition loss of the catalytic material carried on the carrier due to shocks and vibrations applied to the carrier, there has been devised a catalyst carrier which is in the form of block measuring, for example, from tenth of a liter to liters and having a number of through passageway extending in one or more directions. The catalyst in the block form of this nature will be herein referred to as a "monolithic catalyst" and typically includes a catalyst having a honey comb structure. A typical method of suspending a catalytic material on a monolithic carrier includes steps of impregnating a solution containing the catalytic material in the monolithic catalyst carrier and of sintering the catalyst carrier. The monolithic catalysts prepared according to the above method is, however, disadvantageous in that the catalytic material unequally distributes in the catalyst carrier.

It is accordingly a primary object of the present invention to provide an improved method of preparing an improved catalyst.

It is another object of the present invention to provide a monolithic catalyst in which a catalytic material is uniformly adhered to the surface of a catalyst carrier.

Briefly described, a method according to the invention comprises the steps of impregnating a catalyst carrier with a solution of a catalytic metal compound, neutralizing the solution contained in the carrier with an alkali, drying the catalyst carrier, and sintering the dried catalyst.

In accordance with a method of the invention, there is prepared an aqueous or alcohol solution of an aluminium salt selected from aluminum nitrate, aluminum sulfate, aluminum formate and aluminum chloride. The concentration of the solution should be equal to or higher than 5% by wt. and preferably equal to or higher than 40% by wt. Methyl alcohol, ethyl alcohol, isopropyl alcohol, n-propyl alcohol, buthyl alcohol, isobuthyl alcohol, ethylene glycol, and glycerin may be used for the above alcohol solution. A catalytic metal compound selected from compounds of platinum, palladium, rhodium, iridium, osmium and ruthenium is dissolved in the particular solution and a catalyst carrier is impregnated with the solution now containing the catalytic metal compound. The catalytic carrier is either a monolythic carrier made of a refractory containing an alumina, $\alpha$-alumina cordielite or $\beta$-spodumene, or a granulous carrier made of an activated alumina such as $\gamma$-alumina, $\delta$-alumina and $\theta$-alumina in the form of sphere, extrudate or pellet. The solution in the catalyst carrier is thereafter neutralized with an alkali selected from gaseous ammonia, aqueous ammonia and potassium hydroxide thereby the aluminium salt is inverted to aluminium hydroxide to fix the catalytic metal compound mixed with the aluminium salt onto the surface of the catalyst carrier as follows:

$$Al \cdot X + Alkali \longrightarrow \{Al(OH)_3\}_n$$

The neutralization may be achieved either by flowing ammonia gas through the passageways of the catalyst carrier or by immersing the catalyst carrier in an alkali solution. It is now to be noted that since metal compound is uniformly adhered to the surface of the catalyst carrier as the alminium hydroxide deposits on the surface of the catalyst carrier. The catalyst carrier is thereafter dried and sintered at preferably from 300°C to 1000°C in the atmosphere of either hydrogen or air.

The more detailed nature of the catalyst prepared by the present invention and the advantages of the method over the prior art methods will be more exactly understood from the following examples of the invention and through comparison between these examples and some specimens which are carried out in conventional manners. The accompanying drawing illustrates a plot indicating a relation between the conversion efficiency (to be defined later) of carbon monoxide and propane and the temperature.

EXAMPLE 1

A monolithic catalyst carrier made of cordielite and measuring 0.785 liters was used. The catalyst carrier was impregnated with a 40% by wt. ethyl alcohol solution of $AlCl_3.6H_2O$ containing 2.58% by wt. of $H_2PtCl_6.6H_2O$. After the remaining solution was dropped, ammonia gas was permitted to flow through the passageway of the carrier at a flow rate of 1 liter/min. for 2 minutes, so that gelled alminium hydroxide layer containing chloroplatinic acid was formed on the surface of the carrier. Thereafter, the carrier was dried in a drying furnace at temperatures around 100°C for 15 hours and then sintered in the stream of hydrogen at 800°C for 3 hours. The resultant catalyst contained 0.45% by wt. of platinum as metals.

EXAMPLE 2

A monolithic catalyst carrier consisting of cordielite and measuring 0.785 liters was used. The catalyst carrier was impregnated with a 60% by wt. aqueous solution of $Al(NO_3)_3.9H_2O$ containing 2.58% by wt. of $H_2PtCl_6.6H_2o$. After the remaining solution in the passageway of the carrier was dropped, annomia gas was permitted to flow through the passageway at a flow rate of 3 liters/min. for 7 minutes, so that gelled aluminium hydroxide layer containing chloroplatinic acid was formed on the surface of the carrier. Thereafter, the carrier was dried in a drying furnace at temperatures around 100°C for 15 hours and then sintered in the stream of hydrogen at 800°C for 3 hours. The resultant catalyst contained 0.51% by wt. of platinum as metals.

EXAMPLE 3

A monolithic catalyst carrier consisting of codielite and measuring 0.785 liters was used. The catalyst carrier was impregnated with a saturated aqueous solution of $Al_2(SO_4)_3.18H_2O$ containing 2.58% by wt. of $H_2PtCl_6.6H_2o$. After the remaining solution in the carrier was dropped, ammonia gas was permitted to flow through the passageway of the carrier at a flow rate of 5 liters/min. for 2 minutes, so that gelled aluminium hydroxide containing chloroplatinic acid adhered to the surface of the carrier. Thereafter, the carrier was dried in a drying furnace at temperatures around 100°C for 15 hours and then sintered in the stream of hydrogen at 800°C for 3 hours. The resultant catalyst contained 0.49% by wt. of platinum as metals.

EXAMPLE 4

A monolithic catalyst carrier consisting of cordielite and measuring 0.785 liters was used. The carrier was impregnated with a saturated aqueous solution of $Al_2(SO_4)_3.18H_2o$. After the remaining solution in the carrier was dropped, the carrier was placed in the atmosphere of ammonia for 15 hours. The ammonia atmosphere was prepared in a commercially available desicater of 20 liters in capacity where the lower compartment was filled with ammonia and the carrier was placed on the intermediate biscuit plate. Thereafter, the carrier was dried in a hot air drying machine at a temperature of from 100° to 300°C at a flow rate of from 1 to 10 liters/min. for 30 minutes and, then the carrier sintered in the stream of air at 700°C for 3 hours. The resultant catalyst contained 0.49% by wt. of platinum as metals.

EXAMPLE 5

A monolithic catalyst carrier consisting of cordielite and measuring 0.785 liters was used. The carrier was impregnated with a saturated aqueous solution of $Al_2(SO_4)_3.18H_2O$ containing 1.2% by wt. of $Pd(NO_3)_2$. After the remaining solution in the carrier was dropped, the carrier was placed in the atmosphere of ammonia prepared in the same manner as Example 4 for 15 hours. Thereafter, the carrier dried in a drying furnace at temperatures around 100°C for 15 hours and then sintered in the stream of hydrogen at 800°C for 3 hours. The resultant catalyst contained 0.51% by wt. of palladium as metals.

EXAMPLE 6

A monolithic catalyst carrier consisting of cordielite and measuring 0.785 liters was used. The carrier was impregnated with a saturated aqueous solution of $Al_2(SO_4)_3.18H_2O$ containing 2.85% by wt. $H_2PtCl_6.6H_2 0$. After the remaining solution in the passageway of the carrier was dropped, the carrier was immersed in a IN solution of KOH for one second, so that a gelled aluminium hydroxide layer containing chloroplatinic acid was formed on the surface of the carrier. After the carrier was dried in a drying furnace at temperatures around 100°C for 15 hours, the carrier was sintered in the stream of hydrogen at 800°C for 3 hours. The resultant catalyst contained 0.41% by wt. of platinum as metals.

EXAMPLE 7

A monolithic catalyst carrier made of cardielite and measuring 0.785 liters was used. The carrier was impregnated with a saturated aqueous solution of $Al(NO_5)_3$ containing 2.58% by wt. of $H_2PtCl_6.6H_2O$ and 0.11% by wt. of $RuCl_3.H_2O$. After the remaining solution in the passageway of the carrier was dropped, ammonia gas was permitted to flow through the passageway of the carrier at a flow rate 3 liters/min. for 7 minutes. Thereafter, the carrier was dried in a drying furnace at temperatures around 100°C for 15 hours and then the carrier was sintered in the stream of hydrogen at 800°C for 3 hours. The resultant catalyst contained 0.47% by wt. platinum and 0.024% by wt. of ruthenium as metals.

EXAMPLE 8

One liter of catalyst carrier of non-monlithic type consisting of commercially available activated chialmina of about 6 to 8 mesh per square inch was impregnated with a 40% by wt. aqueous solution of $AlCl_3.6H_2O$ containing 2.58% by wt. of $H_2PtCl_6.6H_2O$. After the remaining solution was dropped by placing the carrier on a metallic net of about 10 mesh per square inch, ammonia gas was permitted to flow at a flow rate of 1 liter/min. for 2 minutes, so that a gelled aluminium hydroxide layer containing chloroplatinic acid was formed on the surface of the carrier. The carrier was dried in a drying furnace at temperatures around 100°C for 15 hours and thereafter the carrier was sintered in the stream of hydrogen at 800°C for 3 hours. The resultant catalyst contained 0.53% by wt. of platinum as metals.

SPECIMEN 1

A monolithic catalyst carrier made of cordielite and measuring 0.785 liters was impregnated with a 2.58% by wt. aqueous solution of chloroplatinic acid. After the remaining solution in the passageway of the carrier was dropped, the carrier was dried in a drying furnace at temperatures around 100°C for 15 hours and then sintered in the stream of hydrogen at 800°C for 3 hours. The resultant catalyst contained 0.56% by wt. of platinum as metals.

SPECIMEN 2

1 liter of carrier consisting of commercially available activated chi-alumina of about 6 to 8 mesh per square inch was impregnated with a 2.58% by wt. aqueous solution of chloroplatinic acid. The remaining solution in the passageway of the carrier was dropped by placing the carrier on a metallic net of about 10 mesh per square inch. Thereafter, the carrier was dried in a drying furnace at temperatures 100°C for 15 hours and then the carrier was sintered in the stream of hydrogen at 800°C for 3 hours. The resultant catalyst contained 0.55% by wt. of platinum as metals.

In order to make apparent the improvement achieved by the invention method, the concentration distributions of catalytic metal in the central and peripheral portions of catalysts prepared according to the Examples 1 to 7 and Specimen 1 were determined as set out in the table below:

TABLE 1

| | Amount of Platinum in Catalyst (% by wt.) | | |
| --- | --- | --- | --- |
| | Total Amount | Amount in Central Portion | Amount in Peripheral Portion |
| Example 1 | 0.45 | 0.45 | 0.46 |
| 2 | 0.51 | 0.50 | 0.54 |
| 3 | 0.49 | 0.48 | 0.50 |
| 4 | 0.49 | 0.48 | 0.49 |
| 5 | 0.51 | 0.49 | 0.51 |
| 6 | 0.41 | 0.37 | 0.43 |
| 7 | 0.47 | 0.45 | 0.48 |
| Specimen 1 | 0.56 | 0.05 | 0.65 |

It is obvious from the above data the catalytic metal distributes more uniformly in catalyst prepared according to the Examples 1 to 7 than in Specimen 1.

Activity tests were conducted on the catalysts prepared according to the Examples 1 to 8 and the Specimens 1 and 2 through oxidization reaction of gaseous mixture having contents set out in following table 2 at a gaseous hourly space velocity of 15,000 ($hr^{-1}$).

TABLE 2

| Contents | Concentration |
| --- | --- |
| Carbon monoxide | 2.0% |
| Propane | 500 ppm |
| Nitrogen monoxide | 1000 ppm |
| Carbon dioxide | 12.0% |
| Oxygen | 2.5% |
| Water | 5.0% |
| Nitrogen | residua |

The activity tests were conducted on carbon monoxide and propane determining conversion ratio (%) in terms of the temperature (°C) while changing the temperature of the catalyst bed from 100°C to 600°C. The data collected can be plotted as shown in the accompanying drawing.

It is possible to compare the activities of catalyst with one another by comparing the 90% conversion temperatures obtained from the conversion curves. It is apparent that the higher the 90% conversion temperature, the poorer the activity of the catalyst.

Activity tests were conducted on the catalyst prepared according to the Examples 1 to 8 and the specimens 1 and 2 with respect to carbon monoxide and propane. The collected data is set out in the following table:

TABLE 3

| | 90% Conversion Temperature (°C) | |
| --- | --- | --- |
| | CO | $C_3H_8$ |
| Example 1 | 265 | 390 |
| 2 | 270 | 405 |
| 3 | 230 | 375 |
| 4 | 250 | 365 |
| 5 | 260 | 390 |
| 6 | 245 | 400 |
| 7 | 220 | 350 |
| 8 | 230 | 360 |
| Specimen 1 | 390 | 525 |
| 2 | 300 | 450 |

It is apparent from the above table 3 that the catalysts prepared according to the Examples 1 to 8 of the invention are superior in activity at low temperatures to those prepared according to the specimens 1 and 2.

What is claimed is:

1. A method of preparing a catalyst, which comprises:

preparing either an aqueous or alcohol solution of a catalytic metal compound selected from the group consisting of platinum, palladium, rhodium, iridium, osmium and ruthenium and an aluminum salt which is soluble in either water or alcohol;

impregnating a catalyst carrier with said solution;

converting said aluminum salt in said solution into gelled aluminum hydroxide by neutralizing with an alkali for fixing said catalytic metal compound with said aluminum salt onto said catalyst carrier;

drying said catalyst carrier; and sintering the dried catalyst carrier in the atmosphere of either hydrogen or air at a high temperature.

2. A method as claimed in claim 1, wherein said catalyst carrier is a monolithic carrier made of a substance selected from the group consisting of a refractory containing an alumina, cordierite and β-spodumene.

3. A method as claimed in claim 1, in which said catalyst carrier is a granulous carrier made of an activated alumina.

4. A method as claimed in claim 3, in which said activated alumina is selected from the group consisting of γ-alumina, δ-alumina and θ-alumina.

5. A method as claimed in claim 1, in which said alcohol is selected from the group consisting of isopropyl alcohol, n-propyl alcohol, butyl alcohol, isobutyl alcohol, ethylene glycol, and glycerin.

6. A method as claimed in claim 1, in which said aluminium salt is selected from the group consisting of $AlCl_3.6H_2O$, $Al(NO_3)_3.9H_2O$, $Al_2(SO_4)_3.18H_2O$, and $Al(HCO_2)_3$.

7. A method as claimed in claim 1, in which said alkali is selected from the group consisting of gaseous ammonia, aqueous ammonia and potassium hydroxide.

8. A method as claimed in claim 1, in which said neutralizing step includes permitting ammonia gas to flow through said catalyst carrier.

9. A method as claimed in claim 1, in which said neutralizing step includes placing said catalyst carrier in the atmosphere of ammonia.

10. A method as claimed in claim 1, in which said neutralizing step includes immersing said carrier in a solution of said alkali.

11. A method as claimed in claim 1, in which said high temperature is of from 300°C to 1000°C.

* * * * *